United States Patent [19]
Kurihara

[11] Patent Number: 4,521,084
[45] Date of Patent: Jun. 4, 1985

[54] PHOTOGRAPHIC LENS SYSTEM

[75] Inventor: Takashi Kurihara, Tokyo, Japan

[73] Assignee: Olympus Optical Co., Ltd., Tokyo, Japan

[21] Appl. No.: 545,776

[22] Filed: Oct. 26, 1983

[30] Foreign Application Priority Data

Nov. 12, 1982 [JP] Japan .............................. 57/197542

[51] Int. Cl.$^3$ .......................... G02B 9/34; G02B 13/18
[52] U.S. Cl. ...................................... 350/432; 350/469
[58] Field of Search .............................. 350/432, 469

[56] References Cited
U.S. PATENT DOCUMENTS 4,373,786  2/1983  Yamada .............................. 350/432

FOREIGN PATENT DOCUMENTS 57-38409   3/1982  Japan .
57-116313  7/1982  Japan .

Primary Examiner—John K. Corbin
Assistant Examiner—Rebecca D. Gass
Attorney, Agent, or Firm—Cushman, Darby & Cushman

[57] ABSTRACT

A photographic lens system comprising a first, second, third and fourth lens components wherein the first lens component is a positive meniscus lens, the second lens component is a biconcave lens, the third lens component is a biconvex lens, the fourth lens component is a negative meniscus lens, and the surface on the object side of the second lens component is arranged as an aspherical surface, the photographic lens system having a large aperture ratio, well corrected aberrations and short overall length.

7 Claims, 5 Drawing Figures

4,521,084

PHOTOGRAPHIC LENS SYSTEM

BACKGROUND OF THE INVENTION (a) Field of the Invention

The present invention relates to a photographic lens system and, more particularly, to a photographic lens system with a field angle about 45°, large aperture ratio of F/2.8, telephoto ratio about 1.0 and short overall length.

(b) Description of the Prior Art

To make the overall length of a wide-angle lens system with four-element lens configuration short, it is known to arrange the lens system as a so-called telephoto type lens system by arranging a concave lens at the rear position in the lens system and to thereby make the telephoto ratio small. The lens system disclosed in Japanese published unexamined patent application No. 38409/82 is known as the above-mentioned type of wide-angle lens system. However, in case of the lens system shown in said patent application, the aperture ratio is small, i.e., F/3.5.

SUMMARY OF THE INVENTION

It is, therefore, a primary object of the present invention to provide a photographic lens system of the above-mentioned telephoto type with a four-element lens configuration which is arranged, by adopting an aspherical surface, that the aperture ratio is large, aberrations are corrected favourably and overall length is short.

The photographic lens system according to the present invention has the lens configuration as shown in FIG. 1, i.e., it comprises a first, second, third and fourth lens components, the first lens component being a positive meniscus lens arranged to be convex toward the object side, the second lens component being a biconcave lens, the third lens component being a biconvex lens, the fourth lens component being a negative meniscus lens arranged to be concave toward the object side. Besides, the photographic lens system according to the present invention is arranged that the surface on the object side of the second lens component is formed as an aspherical surface and said lens system fulfills the conditions (1) through (4) shown below:

(1) $-0.58 < f(n_2-1)/r_3 < -0.16$
(2) $4.5 \times 10^{-4} < |\Delta x/f| < 2.0 \times 10^{-3}$
(3) $\nu_1 - \nu_2 > 19.0$
(4) $0.11f < d_5 < 0.1f$ where, reference symbol f represents the focal length of the lens system as a whole, reference symbol $r_3$ represents the radius of curvature of reference surface for the aspherical surface on the object side of the second lens component, referene symbol $n_2$ represents the refractive index of the second lens component, reference symbols $\nu_1$ and $\nu_2$ respectively represent Abbe's numbers of the first and second lens components, and reference symbol $\Delta x$ represents the amount of deviation of the aspherical surface, which is adopted as the surface on the object side of the second lens component, from the reference surface which is measured in the x direction (x axis represents the optical sxis) at the position of the maximum effective diameter.

In the photographic lens system according to the present invention having the above-mentioned lens configuration, the shape of the aspherical surface, which is adopted as the surface on the object side of the second lens component, is expressed by the formula shown below when x axis represents the optical axis and y axis represents the direction at a right angle to the optical axis:

$$x = (y^2/r_3)/(1 + \sqrt{1 - (y/r_3)^2}) + \Delta x$$

$$\Delta x = A_2 y^2 + A_4 y^4 + A_6 y^6 + A_8 y^8 + A_{10} y^{10}$$

where, reference symbols $A_2$, $A_4$, $A_6$, $A_8$ and $A_{10}$ respectively represent coefficients of aspherical surface.

When it is tried to make the aperture ratio large, in case of a lens system of such type as the photographic lens system according to the present invention, the radius of curvature of the surface on the object side of the second lens component, which is a concave lens, should be made small in order to correct spherical aberration caused by the first lens component. When, however, the radius of curvature of said surface is made small, astigmatism and coma flare are caused at the intermediate image height.

The photographic lens system according to the present invention is arranged to prevent astigmatism and coma flare from occurring by making the power of the surface on the object side of the second lens component weak and, at the same time, to strengthen the correcting action for spherical aberration, which is weakened by the above-mentioned arrangement, by forming the surface on the object side of the second lens component as an aspherical surface.

The condition (1) defines the power of the surface on the object side of the second lens component. If the value defined by the condition (1) becomes smaller than the lower limit thereof, the power of said surface becomes strong and it is difficult to correct astigmatism and coma at the intermediate image height. In this case, it is preferable to make the refractive index $n_2$ of the second lens component as $n_2 > 1.7$ because it is then possible to make the radius of curvature of the surface on the object side of said lens component large.

If the amount of deviation $\Delta x$ of the surface (aspherical surface) on the object side of the second lens component in respect to the reference surface for the aspherical surface becomes smaller than the lower limit of the condition (2), it is difficult to correct spherical aberration. If $\Delta x$ becomes larger than the upper limit of the condition (2), coma flare occurs in the marginal portion of the image surface, and it is difficult to correct it.

If the power of the surface on the object side of the second lens component becomes weak and the value defined by the condition (1) becomes larger than the upper limit thereof, it is difficult to correct spherical aberration even when said surface is formed as an aspherical surface and the amount of deviation $\Delta x$ from the reference surface is selected as an adequate value.

The condition (3) is established in order to correct longitudinal chromatic aberration. If the value defined by the condition (3) becomes smaller than the lower limit thereof, it is impossible to satisfactorily correct chromatic aberration, which is caused by the front lens group (the first and second lens components), by means of the rear lens group (the third and fourth lens components) and, consequently, longitudinal chromatic aberration occurs.

If $d_5$ becomes smaller than the lower limit of the condition (4), astigmatic difference at the intermediate image height becomes large, and it is difficult to correct it. If $d_5$ becomes larger than the upper limit of the condition (4), the third lens component becomes thick. As a result, lateral chromatic aberration caused by the third lens component becomes large, and it is difficult to correct it.

DETAILED DESCRIPTION OF THE PREFERRED EMBODIMENTS

Figure 1:
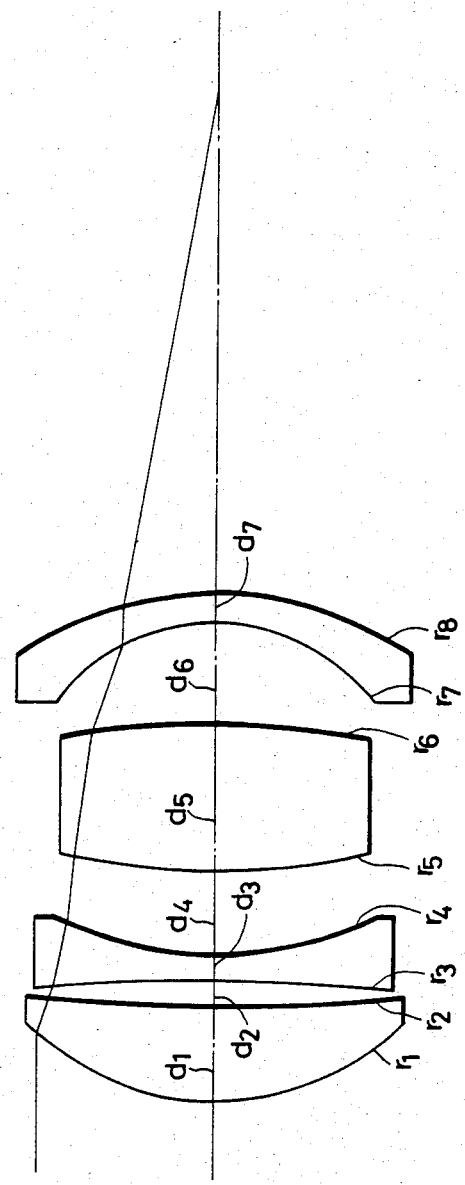
FIG. 1 shows a sectional view of the photographic lens system according to the present invention.
Figure 2:
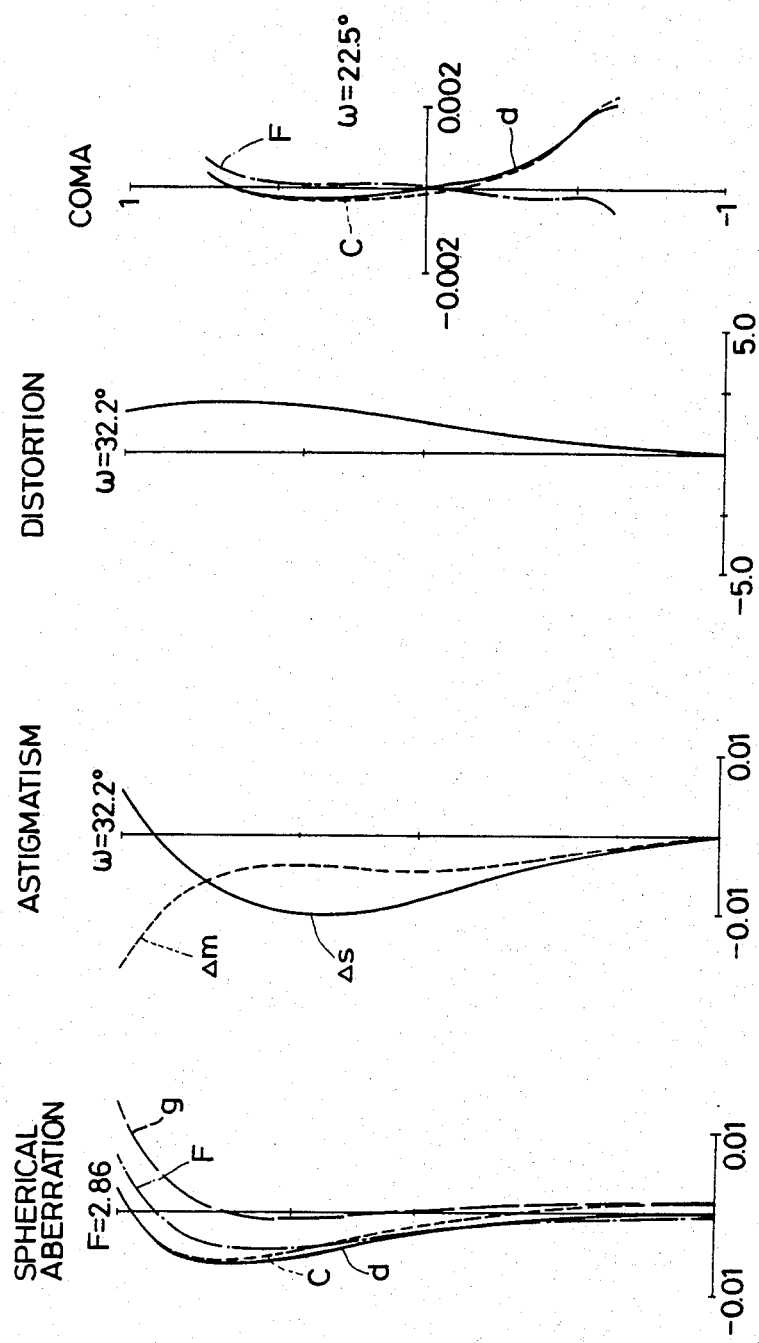
FIGS. 2 through 5 respectively show graphs illustrating aberration curves of Embodiments 1 through 4 of the photographic lens system according to the present invention.
Figure 3:
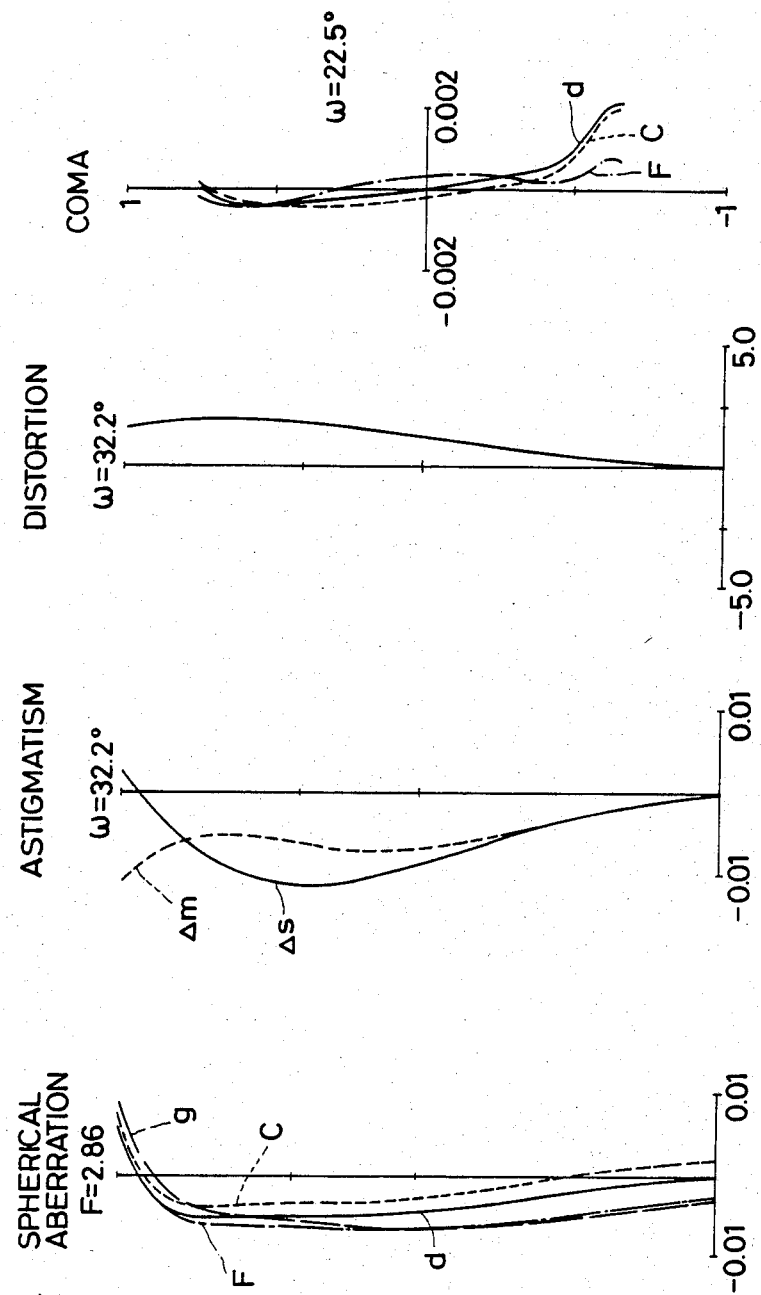
Figure 4:
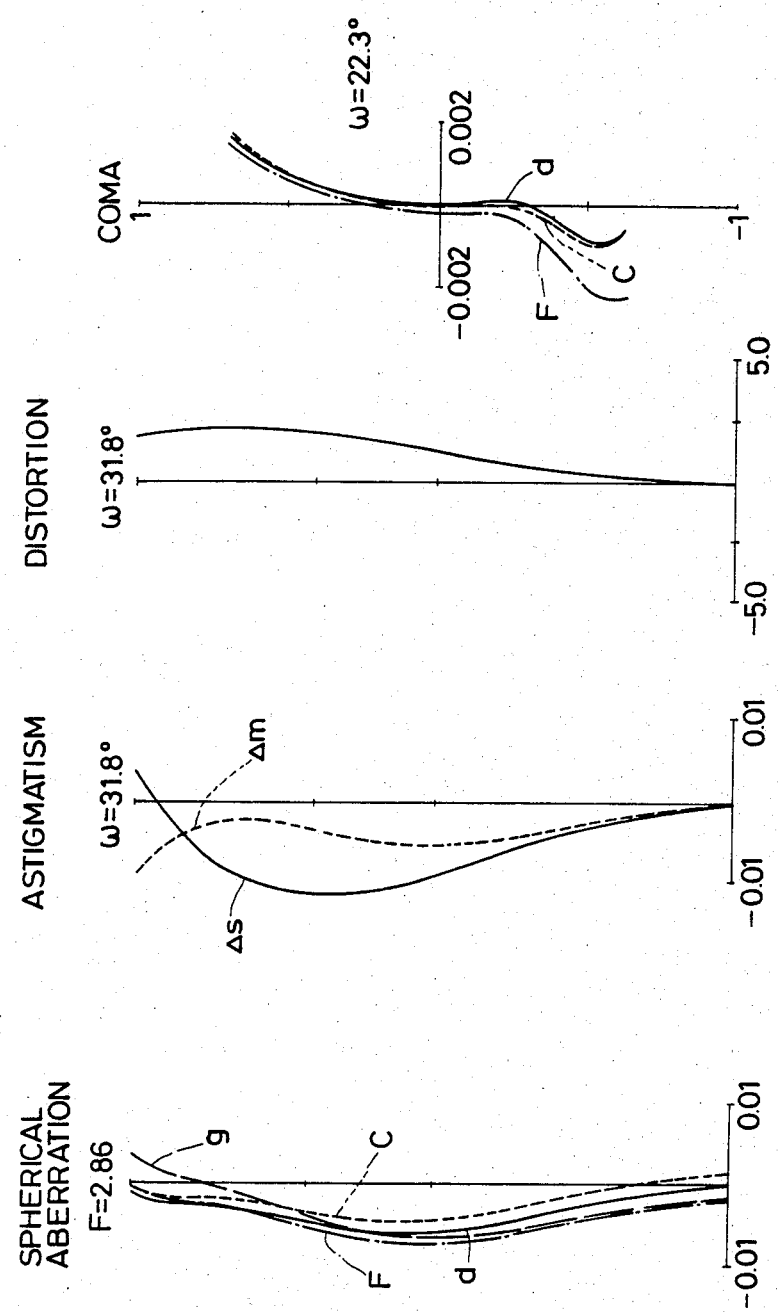
Figure 5:
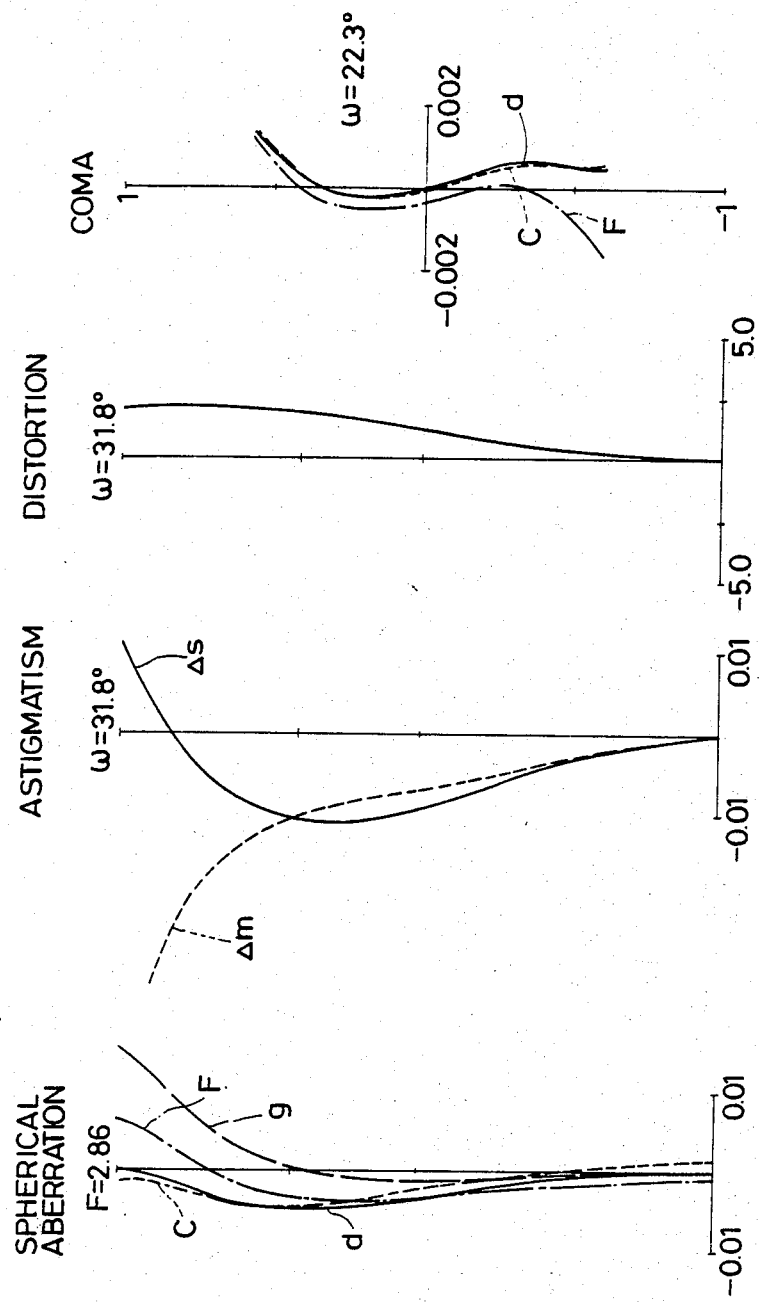

Now, preferred embodiments of the photographic lens system according to the present invention described so far are shown below.

Embodiment 1
$f = 1$, F/2.8, $2\omega = 64.3°$
$r_1 = 0.324$
$d_1 = 0.116$    $n_1 = 1.77250$    $\nu_1 = 49.66$
$r_2 = 0.737$
$d_2 = 0.025$
$r_3 = -3.039$ (aspherical surface)
$d_3 = 0.023$    $n_2 = 1.80519$    $\nu_2 = 25.43$
$r_4 = 0.496$
$d_4 = 0.071$
$r_5 = 0.541$
$d_5 = 0.131$    $n_3 = 1.51742$    $\nu_3 = 52.41$
$r_6 = -0.423$
$d_6 = 0.159$
$r_7 = -0.232$
$d_7 = 0.046$    $n_4 = 1.48749$    $\nu_4 = 70.15$
$r_8 = -0.650$
coefficient of aspherical surface
$A_2 = 0$, $A_4 = -2.608$, $A_6 = 9.668$
$A_8 = -3.809 \times 10^2$, $A_{10} = -3.716 \times 10^3$
telephoto ratio 1.01
$(n_2 - 1)/r_3 = -0.26$
$\Delta x = -1.49 \times 10^{-3}$
$\nu_1 - \nu_2 = 24.23$ Embodiment 2
$f = 1$, F/2.8, $2\omega = 64.3°$
$r_1 = 0.331$
$d_1 = 0.112$    $n_1 = 1.80400$    $\nu_1 = 46.57$
$r_2 = 0.669$
$d_2 = 0.022$
$r_3 = -2.469$ (aspherical surface)
$d_3 = 0.024$    $n_2 = 1.80519$    $\nu_2 = 25.43$
$r_4 = 0.561$
$d_4 = 0.072$
$r_5 = 0.552$
$d_5 = 0.133$    $n_3 = 1.5118$    $\nu_3 = 51.02$
$r_6 = -0.412$
$d_6 = 0.159$
$r_7 = -0.228$
$d_7 = 0.029$    $n_4 = 1.4645$    $\nu_4 = 65.94$
$r_8 = -0.665$
coefficient of aspherical surface
$A_2 = 0$, $A_4 = -1.881$, $A_6 = -7.743 \times 10^1$
$A_8 = 3.486 \times 10^3$, $A_{10} = -6.433 \times 10^4$
telephoto ratio 1.01
$(n_2 - 1)/r_3 = -0.33$
$\Delta x = -1.56 \times 10^{-3}$
$\nu_1 - \nu_2 = 21.14$ Embodiment 3
$f = 1$, F/2.8, $2\omega = 63.6°$
$r_1 = 0.304$
$d_1 = 0.120$    $n_1 = 1.72916$    $\nu_1 = 54.68$
$r_2 = 0.740$
$d_2 = 0.022$
$r_3 = -3.696$ (aspherical surface)
$d_3 = 0.023$    $n_2 = 1.78473$    $\nu_2 = 25.71$
$r_4 = 0.493$
$d_4 = 0.071$
$r_5 = 0.526$
$d_5 = 0.143$    $n_3 = 1.53257$    $\nu_3 = 45.91$
$r_6 = -0.448$
$d_6 = 0.126$
$r_7 = -0.225$
$d_7 = 0.058$    $n_4 = 1.60312$    $\nu_4 = 60.70$
$r_8 = -0.556$
coefficient of aspherical surface
$A_2 = 0$, $A_4 = -1.330$, $A_6 = -1.066 \times 10^2$
$A_8 = 4.356 \times 10^3$, $A_{10} = -6.319 \times 10^4$
telephoto ratio 1.00
$(n_2 - 1)/r_3 = -0.21$
$\Delta x = -1.20 \times 10^{-3}$
$\nu_1 - \nu_2 = 28.97$ Embodiment 4
$f = 1$, F/2.8, $2\omega = 63.6°$
$r_1 = 0.269$
$d_1 = 0.094$    $n_1 = 1.69701$    $\nu_1 = 48.51$
$r_2 = 2.305$
$d_2 = 0.022$
$r_3 = -1.583$ (aspherical surface)
$d_3 = 0.028$    $n_2 = 1.80519$    $\nu_2 = 25.43$
$r_4 = 0.386$
$d_4 = 0.077$
$r_5 = 0.653$
$d_5 = 0.143$    $n_3 = 1.67271$    $\nu_3 = 32.10$
$r_6 = -0.825$
$d_6 = 0.097$
$r_7 = -0.202$
$d_7 = 0.028$    $n_4 = 1.59551$    $\nu_4 = 39.21$
$r_8 = -0.341$
coefficient of aspherical surface
$A_2 = 0$, $A_4 = 0.5623$, $A_6 = 1.918 \times 10^1$
$A_8 = -5.593 \times 10^2$, $A_{10} = 1.142 \times 10^4$
telephoto ratio 0.99
$(n_2 - 1)/r_3 = -0.51$
$\Delta x = 5.59 \times 10^{-4}$
$\nu_1 - \nu_2 = 23.08$ In embodiments shown in the above, reference symbol f represents the focal length of the lens system as a whole, reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses, and reference symbols $\nu_1$, $\nu_2$, $\nu_3$ and $\nu_4$ respectively represent Abbe's numbers of respective lenses.

I claim:

1. A photographic lens system with a short overall length comprising a first, second, third and fourth lens components wherein said first lens component is a positive meniscus lens arranged to be convex toward the object side, said second lens component is a biconcave lens, said third lens component is a biconvex lens and said fourth lens component is a negative meniscus lens arranged to be concave toward the object side, the surface on the object side of said second lens component being arranged as an aspherical surface, said photographic lens system fulfilling the conditions (1) through (4) shown below:

(1) $-0.58 < f(n_2'1)/r_3 < -0.16$
(2) $4.5 \times 10^{-4} < |\Delta x/f| < 2.0 \times 10^{-3}$
(3) $\nu_1 - \nu_2 > 19.0$
(4) $0.11f < d_5 < 0.16f$ where, reference symbol f represents the focal length of the lens system as a whole, reference symbol $r_3$ represents the radius of curvature of reference surface for the aspherical surface on the object side of the second lens component, reference symbol $d_5$ represents the thickness of the third lens component, reference symbol $n_2$ represents the refractive index of the second lens component, reference symbols $\nu_1$ and $\nu_2$ respectively represent Abbe's numbers of the first and second lens components, and reference symbol $\Delta x$ represents the amount of deviation of the aspherical surface on the object side of the second lens component from said reference surface which is measured in the x direction at the position of the maximum effective diameter.

2. A photographic lens system according to claim 1 wherein said aspherical surface adopted as the surface on the object side of said second lens component is expressed by the following formula:

$$x = (y^2/r_3)/(1 + \sqrt{1 - (y/r_3)^2}) + \Delta x$$

$$\Delta x = A_2 y^2 + A_4 y^4 + A_6 y^6 + A_8 y^8 + A_{10} y^{10}$$

where, reference symbols $A_2$, $A_4$, $A_6$, $A_8$ and $A_{10}$ respectively represent coefficients of aspherical surface.

3. A photographic lens system according to claim 2 wherein the refractive index $n_2$ of said second lens component fulfills the following condition:

$n_2 > 1.7$.

4. A photographic lens system according to claim 3, in which said photographic lens system has the following numerical data:

$f = 1$, F/2.8, $2\omega = 64.3°$
$r_1 = 0.324$
$d_1 = 0.116$   $n_1 = 1.77250$   $\nu_1 = 49.66$
$r_2 = 0.737$
$d_2 = 0.025$
$r_3 = -3.039$ (aspherical surface)
$d_3 = 0.023$   $n_2 = 1.80519$   $\nu_2 = 25.43$
$r_4 = 0.496$
$d_4 = 0.071$
$r_5 = 0.541$
$d_5 = 0.131$   $n_3 = 1.51742$   $\nu_3 = 52.41$
$r_6 = -0.423$
$d_6 = 0.159$
$r_7 = -0.232$
$d_7 = 0.046$   $n_4 = 1.48749$   $\nu_4 = 70.15$
$r_8 = -0.650$
coefficient of aspherical surface
$A_2 = 0$, $A_4 = -2.608$, $A_6 = 9.668$
$A_8 = -3.809 \times 10^2$, $A_{10} = -3.716 \times 10^3$
telephoto ratio 1.01
$(n_2 - 1)/r_3 = -0.26$
$\Delta x = -1.49 \times 10^{-3}$
$\nu_1 - \nu_2 = 24.23$ where, reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses, and reference symbols $\nu_1$, $\nu_2$, $\nu_3$ and $\nu_4$ respectively represent Abbe's numbers of respective lenses.

5. A photographic lens system according to claim 3, in which said photographic lens system has the following numerical data:

$f = 1$, F/2.8, $2\omega = 64.3°$
$r_1 = 0.331$
$d_1 = 0.112$   $n_1 = 1.80400$   $\nu_1 = 46.57$
$r_2 = 0.669$
$d_2 = 0.022$
$r_3 = -2.469$ (aspherical surface)
$d_3 = 0.024$   $n_2 = 1.80519$   $\nu_2 = 25.43$
$r_4 = 0.561$
$d_4 = 0.072$
$r_5 = 0.552$
$d_5 = 0.133$   $n_3 = 1.5118$   $\nu_3 = 51.02$
$r_6 = -0.412$ -continued $d_6 = 0.159$
$r_7 = -0.228$
$d_7 = 0.029$   $n_4 = 1.4645$   $\nu_4 = 65.94$
$r_8 = -0.665$
coefficient of aspherical surface
$A_2 = 0$, $A_4 = -1.881$, $A_6 = -7.743 \times 10^1$
$A_8 = 3.486 \times 10^3$, $A_{10} = -6.433 \times 10^4$
telephoto ratio 1.01
$(n_2 - 1)/r_3 = -0.33$
$\Delta x = -1.56 \times 10^{-3}$
$\nu_1 - \nu_2 = 21.14$ where, reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses, and reference symbols $\nu_1$, $\nu_2$, $\nu_3$ and $\nu_4$ respectively represent Abbe's numbers of respective lenses.

6. A photographic lens system according to claim 3, in which said photographic lens system has the following numerical data:

$f = 1$, F/2.8, $2\omega = 63.6°$
$r_1 = 0.304$
$d_1 = 0.120$   $n_1 = 1.72916$   $\nu_1 = 54.68$
$r_2 = 0.740$
$d_2 = 0.022$
$r_3 = -3.696$ (aspherical surface)
$d_3 = 0.023$   $n_2 = 1.78473$   $\nu_2 = 25.71$
$r_4 = 0.493$
$d_4 = 0.071$
$r_5 = 0.526$
$d_5 = 0.143$   $n_3 = 1.53257$   $\nu_3 = 45.91$
$r_6 = -0.448$
$d_6 = 0.126$
$r_7 = -0.225$
$d_7 = 0.058$   $n_4 = 1.60312$   $\nu_4 = 60.70$
$r_8 = -0.556$
coefficient of aspherical surface
$A_2 = 0$, $A_4 = -1.330$, $A_6 = -1.066 \times 10^2$
$A_8 = 4.356 \times 10^3$, $A_{10} = -6.319 \times 10^4$
telephoto ratio 1.00
$(n_2 - 1)/r_3 = -0.21$
$\Delta x = -1.20 \times 10^{-3}$
$\nu_1 - \nu_2 = 28.97$ where, reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses, and reference symbols $\nu_1$, $\nu_2$, $\nu_3$ and $\nu_4$ respectively represent Abbe's numbers of respective lenses.

7. A photographic lens system according to claim 3, in which said photographic lens system has the following numerical data:

$f = 1$, F/2.8, $2\omega = 63.6°$
$r_1 = 0.269$
$d_1 = 0.094$   $n_1 = 1.69701$   $\nu_1 = 48.51$
$r_2 = 2.305$
$d_2 = 0.022$
$r_3 = -1.583$ (aspherical surface)
$d_3 = 0.028$   $n_2 = 1.80519$   $\nu_2 = 25.43$
$r_4 = 0.386$
$d_4 = 0.077$
$r_5 = 0.653$
$d_5 = 0.143$   $n_3 = 1.67271$   $\nu_3 = 32.10$
$r_6 = -0.825$
$d_6 = 0.097$ $r_7 = -0.202$
$d_7 = 0.028$  $n_4 = 1.59551$  $\nu_4 = 39.21$
$r_8 = -0.341$ coefficient of aspherical surface $A_2 = 0$, $A_4 = 0.5623$, $A_6 = 1.918 \times 10^1$
$A_8 = -5.593 \times 10^2$, $A_{10} = 1.142 \times 10^4$ telephoto ratio 0.99

$(n_2 - 1)r_3 = -0.51$ $\Delta x = 5.59 \times 10^{-4}$ $\nu_1 - \nu_2 = 23.08$ where, reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses, and reference symbols $\nu_1$, $\nu_2$, $\nu_3$ and $\nu_4$ respectively represent Abbe's numbers of respective lenses.

* * * * *